(No Model.)
M. W. PARRISH.
ELECTRIC SIGNALING APPARATUS.
No. 381,576. Patented Apr. 24, 1888.
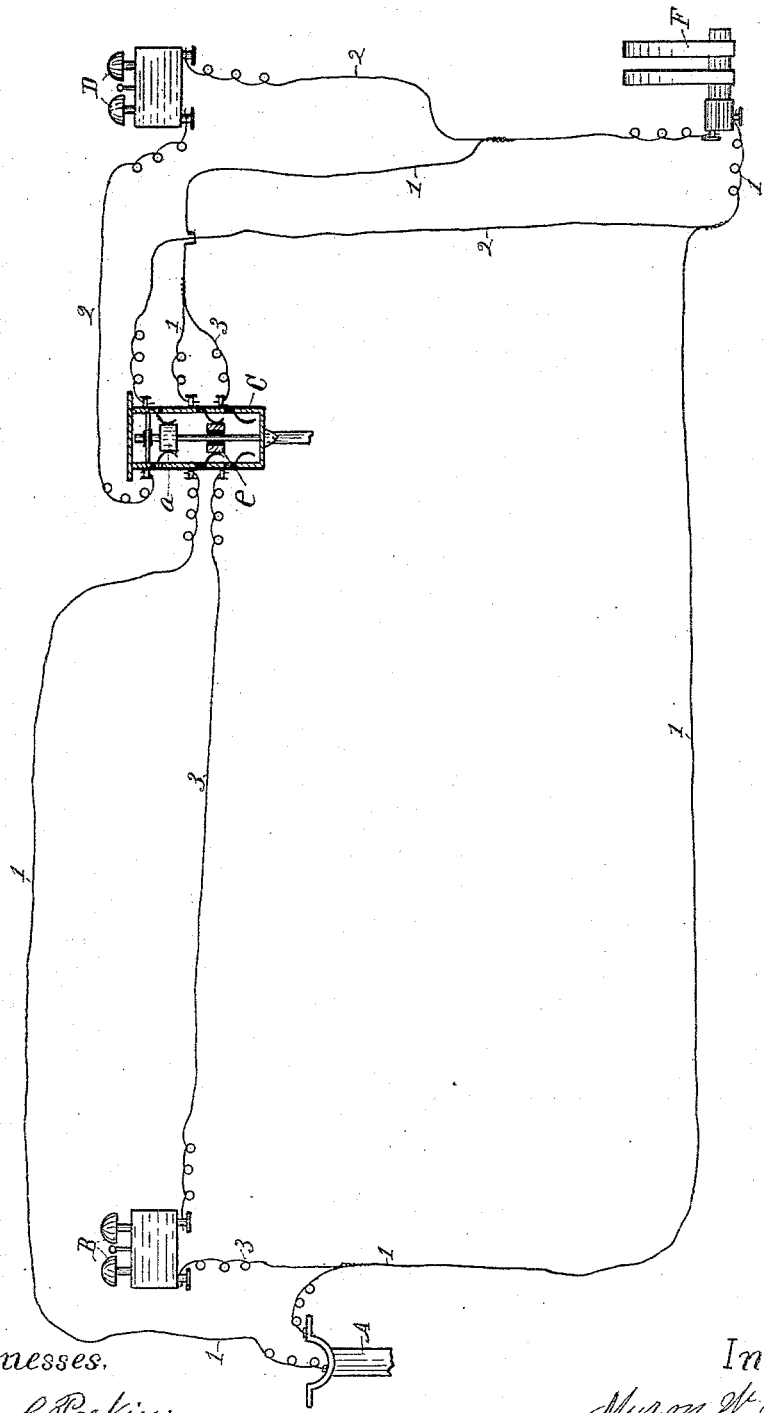
Witnesses.
John C. Perkins
Thos. Dorgan
Inventor.
Myron W. Parrish
By Lucius C. West
Atty.

UNITED STATES PATENT OFFICE.

MYRON W. PARRISH, OF DETROIT, MICHIGAN, ASSIGNOR TO THE PARRISH BROS. AND PECK ELECTRICAL COMPANY, OF SAME PLACE.

ELECTRIC SIGNALING APPARATUS.

SPECIFICATION forming part of Letters Patent No. 381,576, dated April 24, 1888.

Application filed August 3, 1887. Serial No. 246,085. (No model.)

*To all whom it may concern:*

Be it known that I, MYRON W. PARRISH, a citizen of the United States, residing at Detroit, county of Wayne, State of Michigan, have invented a new and useful Electric Signaling Apparatus, of which the following is a specification.

This invention relates to a disclosure in Letters Patent to Parrish and Parrish, No. 322,474, July 21, 1885, which consisted of two circuits, one of a higher resistance than the other, a generator or battery in the circuits, an alarm in the circuit of the higher resistance, and a circuit-breaker in the circuit of the lower resistance.

The object of the present invention is to combine additional elements with those above named to enable the engineer to signal a response to the party who has signaled him.

The invention is especially designed for use on steamboats to enable the captain to signal the engineer, and the latter to signal back to the captain.

In the drawing forming a part of this specification, the old elements above enumerated are shown in their relation with the new features.

Referring to the lettered parts of the drawing, a generator is shown at F and an alarm-bell at D, located in the engine-room when in use. This generator and bell are in the higher-resistance circuit 2, and the generator is in the lower-resistance circuit 1. It will be, of course, understood that there is sufficient length of wire in the magnet-coils of the bell D to make the circuit 2 of greater resistance than the circuit 1.

At A is a circuit-breaker in the lower-resistance circuit, which circuit-breaker in use will be at a convenient location to be operated by the captain. By breaking the circuit 1 the current will traverse the circuit 2 and ring the engineer's bell D. This action is the same as in the patent above referred to.

It is desirable that the captain should know whether or not the engineer heard the bell. It is desirable as well that, by prearranged signals of different significance, the captain and engineer shall be able to communicate orders, responses, directions, warnings, &c., to each other. To this end I connect a captain's bell, B, with the circuit of the lower resistance, and run an additional wire, 3, from the bell B to the generator. For convenience I attach the end of the wire 3 to the right-hand portion of the circuit 1, as shown at the right of the circuit-breaker C; but in effect this wire 3 runs to the generator F, and said wire, together with the lower part of wire 1, establishes another circuit in which are the generator F and the captain's bell B. This latter circuit, when made and the other two are both destroyed, rings the bell B. This will appear clear in the description of the operation.

To enable the engineer to break the circuits of the higher and the lower resistance, and to make the circuit which I will style the "captain's bell-circuit," (or a "return-circuit,") I place in all the circuits a device which may be termed a "combined circuit breaker and maker," (shown at C, and fully described in another pending application by William R. Cole, filed August 3, 1887, Serial No. 246,077.) It consists in a case having a series of spring-metal fingers insulated from the case, and a spring-actuated plunger provided with metal collars $a\ e$, one of which is of course insulated from the plunger. These collars contact with the spring-fingers, as in the drawing, and when in their normal condition the circuits of the higher and the lower resistance are made and the captain's bell circuit is broken. The engineer responds or signals to the captain by pulling the plunger of the device C downward, which action disconnects the collars $a\ e$ from the fingers of the wires 1 2 and contacts the collar $e$ with the fingers of the wire 3, and this "makes" the return-circuit, and hence the captain's bell B rings.

It will be observed that the captain cannot make the return circuit, and that he cannot ring the engineer's bell D except when the device C is in its normal condition, and that both bells cannot be rung at the same time. Should the captain and the engineer make an effort to signal exactly at the same time, the act of the captain would have no effect, and only his bell, B, would ring.

The details of the circuit-breaker A are not herein given; but the device is fully described in another application by William R. Cole, filed August 3, 1887, Serial No. 246,076. As any suitable device may be employed which in its normal condition makes the circuit, and which can be operated to break the circuit, I do not wish to limit my invention to any particular circuit-breaker. Neither do I wish to be limited to the particular device C, many details of which are not herein shown.

Having thus described my invention, what I claim is—

An electric signaling apparatus comprising a circuit of a higher resistance, a circuit of a lower resistance, a generator or battery in said circuits, a bell or alarm in the circuit of the higher resistance, and a circuit-breaker in the lower-resistance circuit, whereby when the latter circuit is broken the circuit of the higher resistance will ring the bell or alarm, and a return-circuit connecting with the generator and partly composed of a portion of the circuit of the lower resistance, a bell or alarm in the return-circuit, and a combined circuit maker and breaker having movable points for contacting with the several wires of the circuits, whereby when disconnected from the higher and lower resistance circuits to "break" said circuits a contact is established with the wires of the return-circuit to "make" the same, and thus give the responsive signal, substantially as set forth.

In testimony of the foregoing I have hereunto subscribed my name in presence of two witnesses.

MYRON W. PARRISH.

Witnesses:
WILLIAM R. COLE,
CHARLES REINKE.